United States Patent
Jodra et al.

(10) Patent No.: US 7,612,926 B2
(45) Date of Patent: Nov. 3, 2009

(54) REPRESENTATIONS OF SPOT COLORS

(75) Inventors: Rodolfo Jodra, Boise, ID (US); Alberto Such, Barcelona (ES); Pau Soler, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 910 days.

(21) Appl. No.: 10/975,529

(22) Filed: Oct. 28, 2004

(65) Prior Publication Data

US 2006/0098233 A1 May 11, 2006

(51) Int. Cl.
*G03F 3/08* (2006.01)
*G06F 15/00* (2006.01)

(52) U.S. Cl. .................................. 358/518; 358/1.9
(58) Field of Classification Search .................. None
See application file for complete search history.

(56) References Cited

U.S. PATENT DOCUMENTS

| 5,963,216 | A | 10/1999 | Chiarabini et al. |
| 6,607,258 | B2 | 8/2003 | Jodra et al. |
| 7,164,494 | B1 * | 1/2007 | Dalton ........................ 358/1.9 |
| 2004/0051884 | A1 * | 3/2004 | Saxton ........................ 358/1.9 |
| 2004/0141192 | A1 | 7/2004 | Jodra et al. |

OTHER PUBLICATIONS

Adobe Acrobat 6.0 Professional Output Guide for Print Service Providers © 2003 Adobe Systems Incorporated.*
Adobe PostScript, Color Separation Conventions for PostScript Language Programs, Technical Note #5044, dated May 24, 1996.
PDF Reference, third edition, Adobe Portable Document Format, version 1.4, Adobe Systems Incorporated, first printing 2001, Section 4.5.5.

* cited by examiner

*Primary Examiner*—Twyler L Haskins
*Assistant Examiner*—Barbara D Reinier

(57) ABSTRACT

A portable document format (PDF) file includes a graphical object and a corresponding spot color space. The spot color space is represented by at least one spot color name and an alternate representation of the spot color with device-independent data.

16 Claims, 3 Drawing Sheets

REPRESENTATIONS OF SPOT COLORS

BACKGROUND

Spot colors for printing are typically specially mixed inks that can be applied by a printing press or printer, and are in contrast with overlayed inks (typically four) which are applied by process printing, e.g. CMYK (cyan, magenta, yellow, black) inks. Spot colors are typically characterized using either CMYK or device independent colors, such as CIELab. Typically only the 100% ink value is characterized, but several values may be used to characterize the spot color. Using more spot values yields more accurate representations of spot colors. When simulating tints, i.e. colors in which the amount of ink is less than 100%, characterization techniques using only information about the 100% ink, the characterizations tend not to produce accurate matches. In order to handle more accurate models of spot colors, models which use some tints besides the 100% ink, specialized raster image processors (RIPs) are used.

In conventional systems it is known to create a certain standard kind of file for use in transmitting color data to be hardcopy-printed or to be proofed. This industry-standardized file contains the image color data, accompanied by a definition of which color space the image data is defined. This color space is often described by a transform called a "profile".

The image color data can encompass multiple sets of image data, and corresponding multiple color space definitions. This is because multiple images or graphical objects can be in a single print job and even on a single page, and in general the multiple images or graphical objects can be generated from different source devices, each having its respective profile.

The industry standard file is most often a specially formatted Adobe Portable Document File® (PDF). In a PDF document, each graphical object in a page has an associated color-space definition, i.e. the "profile," which may be said to "describe" how the color looks. The Adobe PDF file format is described in various materials provided by Adobe Systems, Incorporated, including, for example, the PDF Reference: Adobe portable document format version 1.4, Third Edition, 2001 (first printing), ISBN 0-201-75839-3, herein after referred to as the "PDF Reference." As described in the PDF Reference, the PDF file format includes four special color space families, Pattern, Indexed, Separation and DeviceN.

The color-space definition is most commonly a transform (or transfer function) that can be used to convert the color data in preparation for printing or display on some specific image device, to obtain some specified or desired effect. One common such desired effect is to obtain on one particular image device the closest possible approximation to color as seen or measured on another particular image device. (In this document, "transfer function" is used in its broad sense of any relation between system outputs and inputs.)

The term "color space" is related to the concept of a color language, i.e., a set of coordinates that can be used to describe a color. Some such spaces are simply machine language, i.e. the set of signals used to control a particular image device. These can vary from, e.g., red-green-blue ("RGB") for control of a typical additive-primary monitor, through CMYK for control of a typical subtractive-primary hardcopy printer. The latter may be a large printing press or a small desk-type incremental printer, and essentially anything in between. These machine languages or so-called "native" color spaces sometimes call for no color management at all; they are simply sent directly to the corresponding image device.

In addition to machine languages, a color space may be of the type sometimes called "perceptual," or in the printing industry more commonly referred to as "calorimetric", since what is actually manipulated is almost always visible color as measured rather than as perceived. (For purposes of the present document, the terms "perceptual" and "calorimetric" will be used synonymously.)

In the modern printing industry, conversions from one color space to another, particularly such conversions as are used to take account of the different color-displaying properties of different image devices, are performed by use of one of the various transforms discussed above.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
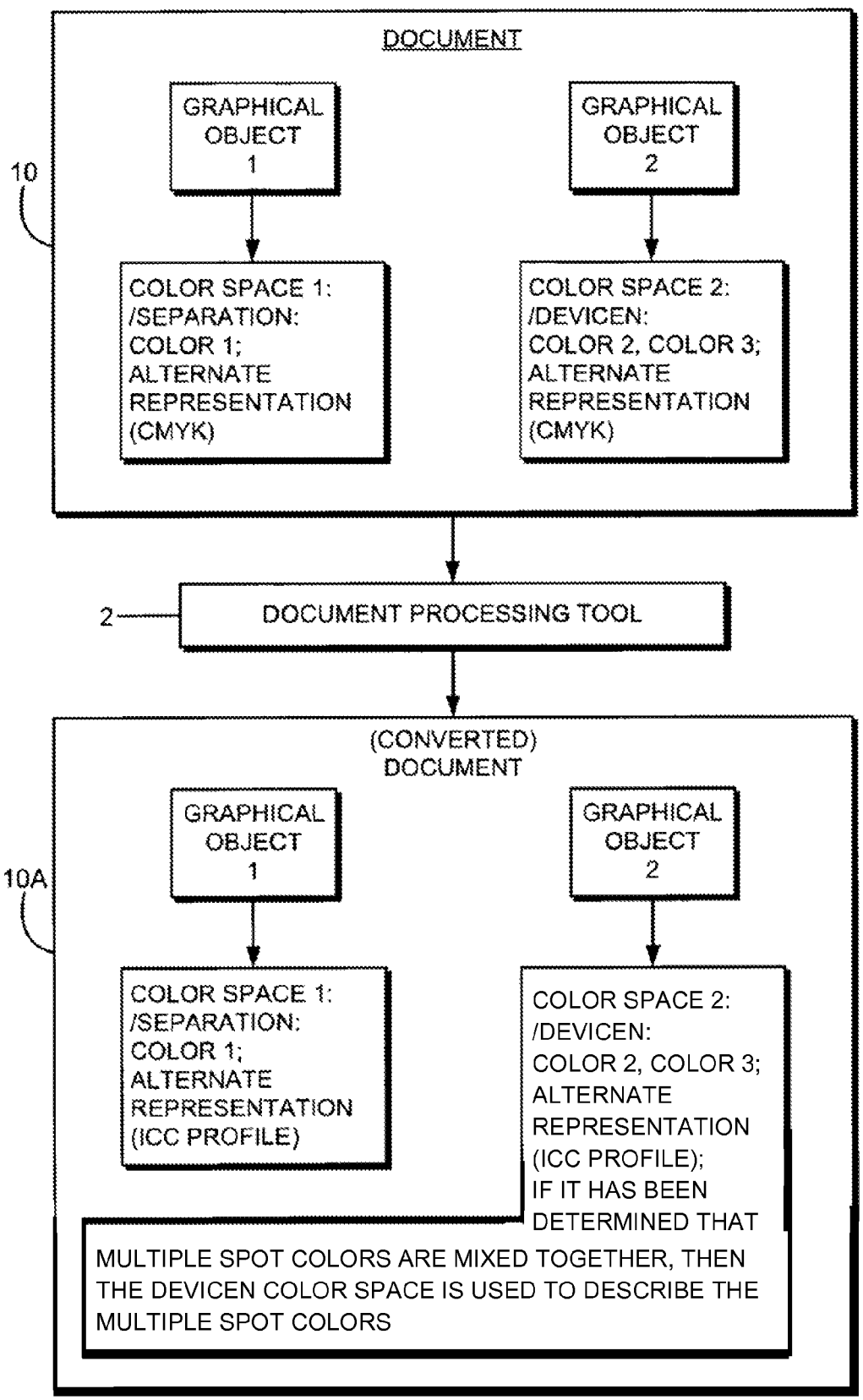
FIG. 1 diagrammatically illustrates an exemplary embodiment of conversion of PDF document file having color spaces with device-dependent spot color data into a PDF file having device-independent spot color profiles.

In the following detailed description and in the several figures of the drawing, like elements are identified with like reference numerals.

An exemplary embodiment of a spot color emulation process achieves accurate spot color emulation using a generic PDF printer or output device such as a generic RIP. A generic RIP is one which processes the PDF files as described in the PDF Reference with no further extensions.

Spot colors may be represented in PDF using a construct called the /Separation color space. This construct, described more fully in the PDF Reference at Section 4.5.5, contains the name of the color and an alternate representation of the color. The alternate representation of the color is usually defined in CMYK. Instead of defining the spot color in CMYK, an embodiment of a spot color emulation process uses as the alternate representation of the color an "ICC" profile. This ICC profile can be used to compute a device-independent description of the color for each tint level. "ICC" refers to the International Color Consortium, an international association of hardware and software vendors that are working to standardize color management.

Once the alternative representation of the spot color has been replaced for the color spaces in the PDF document with the ICC profiles, any generic RIP may use the ICC profile to produce accurate device-independent descriptions of any tint of the spot color. A generic RIP is one which follows the specification developed by Adobe Systems Incorporation. In other words, a specialized RIP is not needed to render accurate emulation of spot colors.

PDF documents are well suited to this implementation because it is possible to access directly all the color spaces in the document. An exemplary process for preparing a PDF document for accurate proofing of spot colors is the following, for each color space in the PDF document: (I) determine whether the color space is a separation color space; and (ii) if so, replace the alternate representation of the color space with the ICC profile equivalent.

The emulation process can be applied to the case in which multiple spot colors are mixed together in a PDF file construct known as DeviceN color space. An ICC profile can be generated which provides a device-independent description of every combination of spot colors. This solution works well if the DeviceN color space contains a small number of colors, e.g. no more than four spot colors. This is usually the case, since usually no more than two spot colors are mixed together. An ICC profile may contain representations for different spot colors. Each of these spot colors will be associated with one of the input channels of the ICC profile.

This conversion of the document to include the device independent ICC profile data for spot colors is diagrammatically illustrated in FIG. 1. FIG. 1 shows a PDF document 10 in a conventional form, which may include, among other image or text data, a graphical object 1 with a corresponding a color space 1, and a second graphical object 2 with a corresponding color space 2. For the sake of illustration, color space 1 is a /Separation color space, and color space 2 is a /DeviceN color space. The color space 1 includes a color name for color 1, and an alternate representation of the color, e.g. in CMYK. The color space 2 includes a color name for color 2 and color 3, and an alternate representation of the color, e.g. in CMYK. The document is processed by a document processing tool 2, to convert the spot color spaces, into converted PDF document 10A according to the above described process. The alternate spot color representations have been replaced with device independent ICC profile data.

An advantage of the process is that accurate proofing of spot colors may be carried out using a PDF-compatible RIP. A further advantage of an embodiment of the process is that more accurate color reproduction is provided than solutions which use only the color for the 100% ink level. The accuracy of the simulation is basically limited by the accuracy of the ICC profile which represents the spot color.

The document processing tool 2, typically implemented in software, analyzes the color spaces specified for different elements in the PDF document. These color spaces are included in specific sections of the document, so it is possible to modify them without accessing all the images in the document. After extracting a color space definition, the document processing tool software may:

a. recognize whether the color space is a Separation or DeviceN color space;

b. extract the color names in the color space c. From the color names, find the name of the color profile which contains the description for this spot color and the input color channels within the profile.

If a profile is not available which describes all the spot color names, the processor may report an error or take some other action.

As an example, consider an ICC profile which contains colors for these three spot colors, Pantone 145C, Pantone 367C and Pantone 689C. This means that the profile describes the color produced by any mix of these spot colors. Now assume that the input document contains the color Pantone 367C. This color is described by channel 2 of the profile. An exemplary document processing tool implementation will find the name of the profile such as "/SpotProfile1" and the channel 2. Then a Separation color space may be defined as [/Separation (Pantone 367C)/SpotProfile1] {0 exch 0}. This is a Separation color space for the spot color named (Pantone 367C). The tint defined for this color will be processed through the Postscript function {0 exch 0}. This means that the tint will be converted into a set of three values 0 tint 0. These three values will be sent to the profile /SpotProfile1. Since the second channel for the profile describes the exemplary spot color (Pantone 367C), the output from the profile will be an accurate CIELab representation of the spot color.

The same mechanism may be used when several spot colors are mixed together, because the ICC profile describes the mix of spot colors. This may be achieved by defining a /DeviceN color space instead of a /Separation color space. The /DeviceN color space describes a mixture of spot colors.

Following is an example processing a DeviceN color space. The original color space definition in the PDF file is:

[/DeviceN [(Pantone 132C) (Pantone Orange)]/DeviceCMYK {0 exch 0}}

This color space indicates the original graphical object or image has two color channels; one channel is Pantone 132C and the other is Pantone Orange.

The alternative representation for this color space is defined in /DeviceCMYK space. The last instructions describe the tint transform procedure which converts the input colors into a suitable CMYK. The implementation of the tint transform function described above just prints the (Pantone 132C) color channel as cyan and the (Pantone Orange) as yellow. An embodiment of the document process tool 2 searches the list of available profiles, e.g. in a spot color ICC profile library, looking for one which represents both the Pantone 132C and the Pantone Orange. Say this color profile is called SpotProfileMix.icc. The implementation then does the following operations:

i. Include a new ICC color space called /SpotProfileMix in the PDF document. This color space will contain the color transformation data stored in the ICC profile.

ii. Modify the alternative space in the DeviceN color space to be the /SpotProfileMix color space.

iii. Modify the tint transform in the DeviceN color space so that the spot color channels in the image are sent to the right color channels in the ICC profile.

For example: say that the ICC profile in question includes three channels:

(Pantone Orange)

(Pantone Green)

(Pantone 132 C)

The new ICC based color space will have the format described in section 4.5.4 of the PDF Reference, and the data looks like:

/SpotProfileMix [/ICCBased 12 0 R]

12 0 obj

<<

/N 4

/Filter /FlateDecode

/Length 4562>> stream

<icc profile data> endstream endobj

The tint transform procedure maps the first channel of the image (Pantone 132C) to the third channel of the profile, and the second channel of the image to the first channel in the profile. It can be, for example:

{exch 0 exch}

The modified DeviceN color space can be, for example:

[/DeviceN [(Pantone 132C) (Pantone Orange)]/SpotProfileMix {exch 0 exch}]

Say that the original color space contains a single spot color

[/Separation (Pantone 132C)/DeviceCMYK {0 0 0}]

The modified version will send the only input channel in the image to the third channel in the ICC profile used above:

[/Separation (Pantone 132C)/SpotProfileMix {0 exch 0 exch}].

Figure 2:
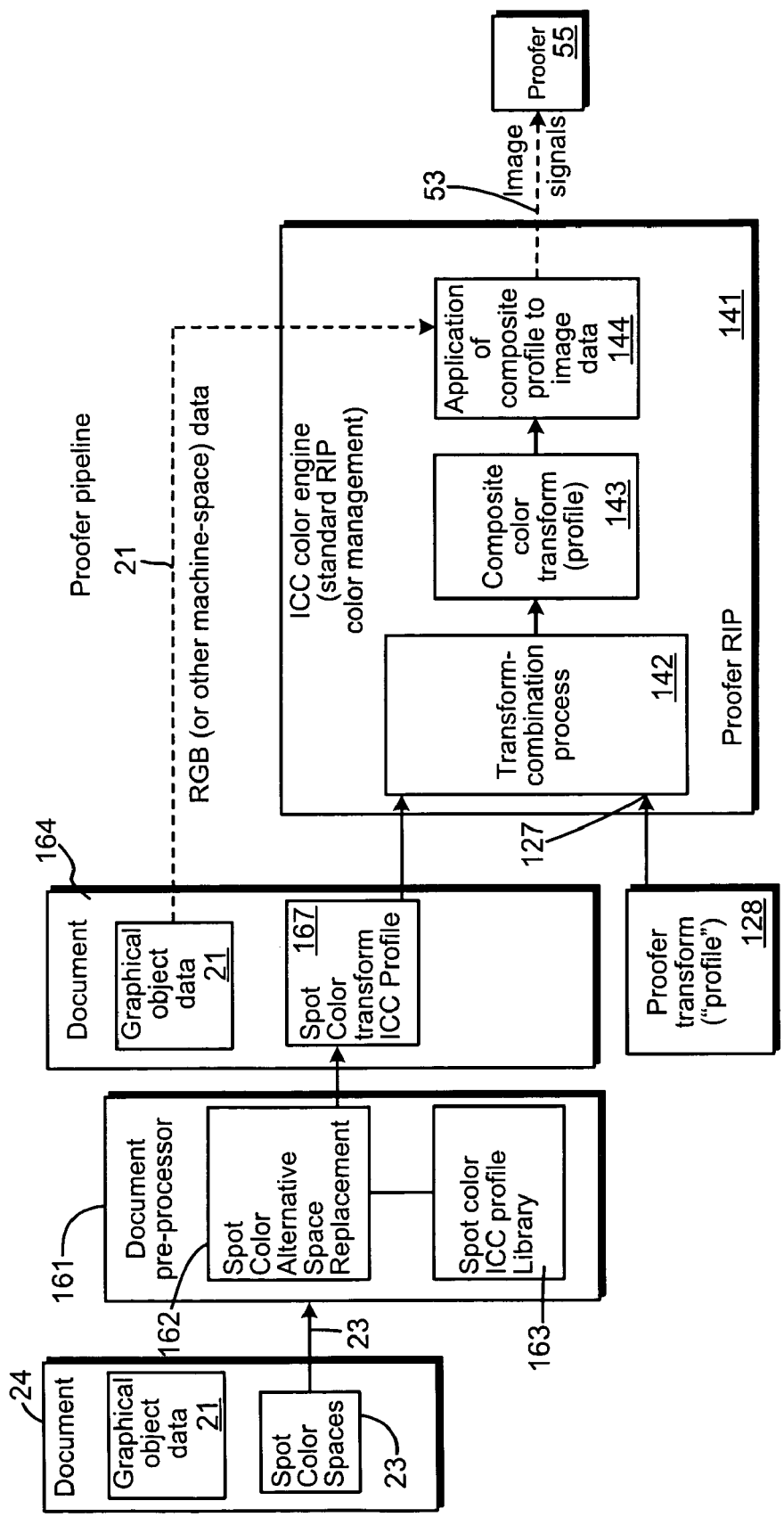
FIG. 2 is a simplified schematic block diagram illustrating a process for conversion of a PDF document and a proofing pipeline.

FIG. 2 illustrates an exemplary embodiment of a block diagram illustrating an exemplary embodiment of a PDF document and a proofer pipeline operating on the PDF document for processing spot colors. Other data and colors may be processed as well by a proofer pipeline, e.g. using techniques described in US 2004/0141192.

A PDF specification document 24 has been generated, which includes graphical object data 21, which usually are very strongly device-dependent (for instance RGB). Spot colors are represented as spot color spaces 23

The subfiles 21, 23 in the PDF specification document 24 are simply numbers. Some other image device such as an intended production printer or a proofer generates a corresponding visible image. The PDF specification document 24 is usually an output from a computer or graphics program.

FIG. 2 illustrates a proofer RIP 141, which may be a generic RIP. A preprocessing module 161 can be located at the document originator's station or at the production printing shop, or any other facility with access to the PDF document 24. In an exemplary embodiment, the preprocessor 161 is a software program running on a computer system, e.g. a work station computer or a computer controller which is part of a proofer station. The preprocessor 161 includes a document processing tool 162 implemented in an exemplary embodiment as a computer program or module. The preprocessor 161 and the document processing tool 16 may be implemented on a computer usable medium having a computer readable code means embodied in the code means, e.g. as firmware or program code stored on a hard drive or other non-volatile memory. The document processing tool 162 performs a spot color alternate space replacement function, as described above regarding FIG. 1, by accessing the spot color ICC profile library 163, which may, for example, be stored in a memory of the computer system running the preprocessor program. The spot color space now includes alternate spot color representations which are device-independent. It stores that new transform or profile 167 in a new version 164 of the PDF image-proofing document, for transmission to the proofing station. The PDF document still includes the graphical object data 21. The new profile 167 can be applied to the tint levels in the graphical object, converting that data into the perceptual near-equivalent, and then adapt the results to the proofer 55 by application of its profile 128, to reconvert the spot color device-independent data into proofer machine signals. The profile 167 and the proofer profile 128 are combined 142 in the RIP 141 to make a composite transform 143. This composite 143 is then applied 144 to the graphical object or image data 21 to generate machine signals 53 for operating the proofer 55.

The preprocessor 161 includes the document processing tool 162, which performs a spot color alternative space replacement process, modifying Specification and DeviceN color space data into ICC profile data as described above, so that the PDF proofing document 164 includes ICC spot color profiles 167 accessed from the spot color ICC profile library 163. The transformation in this exemplary embodiment thus includes replacing the spot color space alternative space with a device independent profile which is embedded in the proofing PDF file 164. The generic RIP 141 samples the gamut of the spot color ICC profile, and processes the gamut sample through the spot color ICC profile, to obtain a corresponding perceptual-space sampling (predicting color appearance from the production press); and this new perceptual-space sampling is then processed through the proofer transform 128; the signal-sample values are then rebuilt into a new interpolation table, which can then be identified as the composite transform 143; and that table is used within the RIP at 144.

Figure 3:
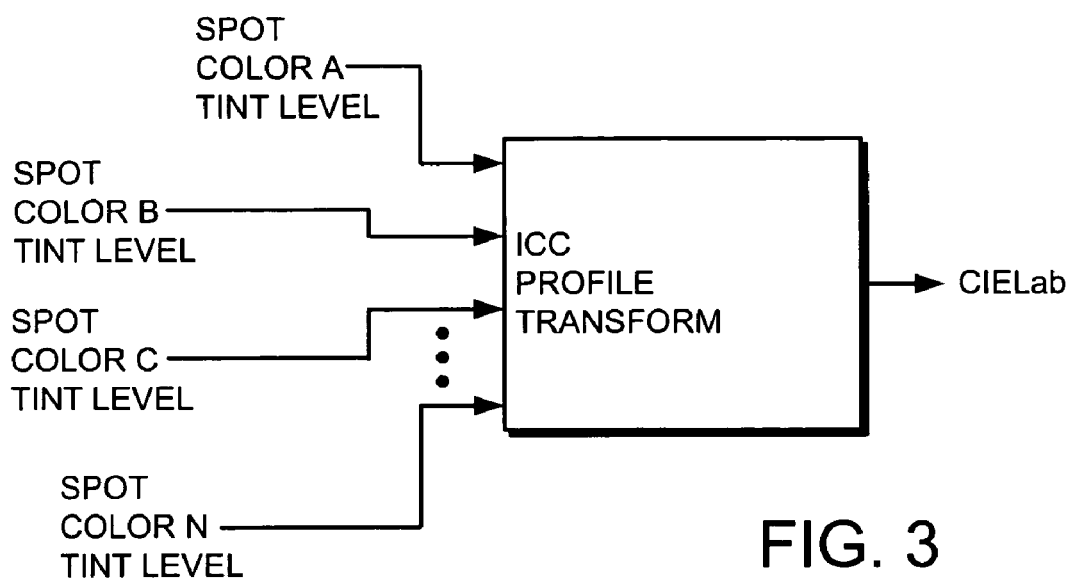
FIG. 3 is a simplified process flow illustrating an ICC profile transform.

By processing input colors through the spot color profile, the result is a device independent prediction of how the spot will appear when printed by the production printer. Applying this profile at the source device input terminal of the RIP leads to formation of a new composite profile. Applying this new composite profile at process 144, in turn to the spot color tints defined in the original image yields machine language image data 53 for driving the proofer. The process 144 performs the exemplary ICC profile transform shown in FIG. 3 to the input channel spot color data to produce output data in another format, for example, CIELab data.

Although the foregoing has been a description and illustration of specific embodiments of the invention, various modifications and changes thereto can be made by persons skilled in the art without departing from the scope and spirit of the invention as defined by the following claims.

What is claimed is:

1. A computer system running a preprocessor program that is implemented on a computer usable medium having computer readable code for preparing a document for proofing of spot colors, the computer readable code causing the following steps to occur comprising:
   accessing a spot color space in the document automatically with the computer system;
   using the computer system to automatically determine whether or not multiple spot colors are mixed together;
   determining whether the color space is a separation space or a DeviceN space automatically with the computer system;
   replacing an alternate color representation for said separation space if the color space is a separation space with a device independent alternate color representation as a new transform automatically with the computer system;
   using the computer system to automatically describe the multiple spot colors based on the DeviceN color space if the multiple spot colors are mixed together;
   applying the new transform to tint levels in the document, modifying the tint levels in the DeviceN color space so that spot color channels are sent to correct corresponding color channels in the device independent alternate color representation, and reconverting the new transform into proofer machine signals as a proofer profile automatically with the computer system; and
   combining the new transform and the proofer profile to produce a composite transform that is applied to image data automatically with the computer system to generate machine signals for operating the proofer.

2. The method of claim 1, wherein said device independent alternate color representation is an International Color Consortium (ICC) profile.

3. The process of claim 1, further comprising: processing each spot color space with a raster image processor (RIP) to produce device-independent descriptions for a tint of the spot color.

4. The process of claim 3, further comprising controlling a display device with output data generated by the RIP to display a representation of the document emulating said spot colors.

5. A computer system running a preprocessor program that is implemented on a computer usable medium having computer readable code for preparing a document for proofing of spot colors, the computer readable code causing the following steps to occur, comprising:

accessing a color space in the document automatically with the computer system;

using the computer system to automatically determine whether or not multiple spot colors are mixed together;

determining whether said color space is a separation, and if the color space is a separation space, replacing an alternate color representation for said separation space with an ICC profile equivalent alternate representation as a new transform automatically with the computer system;

using the computer system to automatically describe the multiple spot colors based on the DeviceN color space if the multiple spot colors are mixed together;

applying the new transform to tint levels in the document, modifying the tint levels in the DeviceN color space so that spot color channels are sent to correct corresponding color channels in the device independent alternate color representation, and reconverting the new transform into proofer machine signals as a proofer profile automatically with the computer system; and combining the new transform and the proofer profile to produce a composite transform that is applied to image data to generate machine signals automatically with the computer system for operating the proofer.

6. The process of claim 5, further comprising: processing each ICC profile with a raster image processor (RIP) to produce device-independent descriptions for a tint of the spot color.

7. A computer system running a preprocessor program that is implemented on a computer usable medium having computer readable code for preparing a PDF document for proofing of spot colors, the computer readable code causing the following steps to occur, comprising, for each color space in the PDF document:

determining whether the color space is a separation color space automatically with the computer system;

using the computer system to automatically determine whether or not multiple spot colors are mixed together;

replacing an alternate representation of the color space if the color space is a separation space with a device-independent spot color profile equivalent as a new transform automatically with the computer system to provide a converted PDF document;

using the computer system to automatically describe the multiple spot colors based on the DeviceN color space if the multiple spot colors are mixed together;

applying the new transform to tint levels in the document, modifying the tint levels in the DeviceN color space so that spot color channels are sent to correct corresponding color channels in the device independent alternate color representation, and reconverting the new transform into proofer machine signals as a proofer profile automatically with the computer system; and combining the new transform and the proofer profile to produce a composite transform that is applied to image data to generate machine signals automatically with the computer system for operating the proofer.

8. The process of claim 7, further comprising an act of: processing the converted PDF document with a raster image processor (RIP).

9. The process of claim 8, further comprising an act of: controlling a display device with data output from the RIP to display a representation of the PDF document to emulate said spot colors.

10. The process of claim 7, wherein said alternate color representation is an International Color Consortium (ICC) profile.

11. A method in a computer system running a preprocessor program that is implemented on a computer usable medium having computer readable code for processing a PDF document, computer readable code causing the following steps to occur, comprising:

analyzing the color spaces specified for different elements in the PDF document automatically with the computer system;

using the computer system to automatically determine whether or not multiple spot colors are mixed together;

for each color space, recognizing whether the color space is a Separation or DeviceN color space automatically with the computer system;

extracting the color names in the Separation and DeviceN color spaces automatically with the computer system;

from the color names, search for the name of a corresponding device-independent spot color profile in a spot color library which contains a description for the color name and corresponding input color channels within the profile automatically with the computer system;

using the computer system to automatically describe the multiple spot colors based on the DeviceN color space if the multiple spot colors are mixed together;

applying the profile to tint levels in the document, modifying the tint levels in the DeviceN color space so that spot color channels are sent to correct corresponding color channels in the device independent alternate color representation, and reconverting the profile into proofer machine signals as a proofer profile automatically with the computer system; and combining the profile and the proofer profile to produce a composite transform that is applied to image data to generate machine signals automatically with the computer system for operating the proofer.

12. The method of claim 11, further comprising: reporting an error if a corresponding spot color profile is not available in the library.

13. The method of claim 11, wherein said spot color library is a library of International Color Consortium (ICC) profiles.

14. A computer system running a preprocessor program that is implemented on a computer usable medium having computer readable code causing the following steps to occur, comprising:

a computer readable code for processing a PDF document, comprising a document processing tool adapted to:

access a spot color space in the PDF document automatically with the computer system;

using the computer system to automatically determine whether or not multiple spot colors are mixed together;

determine whether the color space is a separation space or a DeviceN space, and if the color space is a separation space, replace an alternate color representation for said separation space with a device independent alternate color representation as a new transform automatically with the computer system;

using the computer system to automatically describe the multiple spot colors based on the DeviceN color space if the multiple spot colors are mixed together;

applying the new transform to tint levels in the document, modifying the tint levels in the DeviceN color space so that spot color channels are sent to correct corresponding color channels in the device independent alternate color representation, and reconverting the new transform into proofer machine signals as a proofer profile automatically with the computer system; and combining the new transform and the proofer profile to produce a composite transform that is applied to image data to generate machine signals automatically with the computer system for operating the proofer.

15. The product of claim 14, wherein said device independent alternate color representation is an International Color Consortium (ICC) profile.

16. A document preprocessor in a computer recordable medium configured to execute instructions for processing a PDF document causing the following steps to occur, comprising:

a document processing tool adapted to access a spot color space in the PDF document, determine whether or not multiple spot colors are mixed together, determine whether the color space is a separation space or a DeviceN space, and if the color space is a separation space, replace an alternate color representation for said separation space with a device independent alternate color representation as a new transform, use a computer system to automatically describe the multiple spot colors based on the DeviceN color space if the multiple spot colors are mixed together, apply the new transform to tint levels in the document, modify the tint levels in the DeviceN color space so that spot color channels are sent to correct corresponding color channels in the device independent alternate color representation, and reconvert the new transform into proofer machine signals as a proofer profile and combine the new transform and the proofer profile to produce a composite transform that is applied to image data to generate machine signals for operating the proofer; and a spot color profile library for storing a library of device independent alternate color representations including said device independent alternate color representation.

* * * * *

UNITED STATES PATENT AND TRADEMARK OFFICE
CERTIFICATE OF CORRECTION

| | |
|---|---|
| PATENT NO. | : 7,612,926 B2 |
| APPLICATION NO. | : 10/975529 |
| DATED | : November 3, 2009 |
| INVENTOR(S) | : Rodolfo Jodra et al. |

It is certified that error appears in the above-identified patent and that said Letters Patent is hereby corrected as shown below:

In column 8, line 4, in Claim 11, delete "computer" and insert -- the computer --, therefor.

Signed and Sealed this

Twenty-fourth Day of August, 2010

David J. Kappos
*Director of the United States Patent and Trademark Office*